United States Patent Office 2,809,994
Patented Oct. 15, 1957

2,809,994

METHOD FOR ALKYLATING AROMATIC AMINES

Alfred A. Hinckley, Beverly, Mass., assignor to Metal Hydrides Incorporated, Beverly, Mass., a corporation of Massachusetts No Drawing. Application June 14, 1956,
Serial No. 591,308

8 Claims. (Cl. 260—574)

This invention relates to a method for N-alkylating aromatic amines having at least one replaceable hydrogen atom attached to the nitrogen atom. More particularly, the invention contemplates the use of sodium hydride as the alkylating agent to obtain alkylated products in which one or more of the replaceable hydrogen atoms attached to the nitrogen atom is replaced by an organic radical which is inert toward sodium hydride and has a terminal aliphatic carbon atom linked directly to the nitrogen atom.

Broadly, the invention contemplates the alkylation of compounds represented by the formula

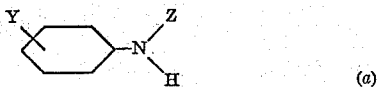
(a)

where Y is an organic radical or hydrogen or other atom which is inert toward sodium hydride and Z is hydrogen or an organic radical which is inert toward sodium hydride to obtain alkylated products represented by either of the formulas

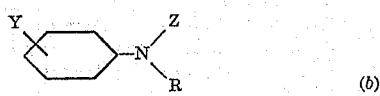
(b)

or

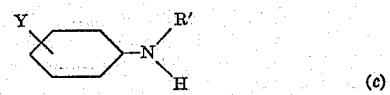
(c)

or

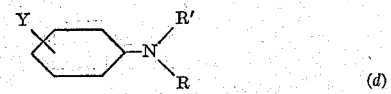
(d)

where R and R' are organic radicals having an aliphatic carbon atom linked directly to the nitrogen atom.

Sodium amide has been employed as the alkylating agent for alkylating aromatic amines but side reactions usually occur and alkylation of the nucleus is a major problem. Other methods have been proposed which require high temperatures and high pressures for good yields.

By the method of the present invention aromatic amines may be alkylated at atmospheric pressure in good yield. The invention provides a method whereby primary aromatic amines may be selectively alkylated to form mono- or di-alkylated amines or whereby the replaceable hydrogen atoms may be replaced by the same organic radical to form symmetrical amines or may be replaced by different organic radicals to form unsymmetrical amines.

In accordance with the method of the present invention the aromatic amine is associated with sodium hydride and certain organic halides in a polar solvent for the amine and the halide and the mixture is heated to start the reaction. The temperature used is not critical but should be sufficiently high to cause the reaction to proceed to substantial completion. Usually, a temperature between about 40° C. and 150° C. is required. The amounts of sodium hydride and organic halide depend upon the amine to be alkylated, that is, whether it is a primary or secondary amine. If a primary amine is being alkylated and a mono-alkylated product is desired, the amounts of sodium hydride and organic halide used should be substantially the amounts theoretically required for this purpose, these amounts being the same when alkylating a secondary amine. About twice these amounts is used when a primary amine is treated to obtain a symmetrical di-alkylated product. If an unsymmetrical alkylated product is desired, the mono-alkylated product is produced and then treated with additional sodium hydride and an organic halide having a different organic radical. The reaction appears to proceed in two stages as illustrated by the following equations:

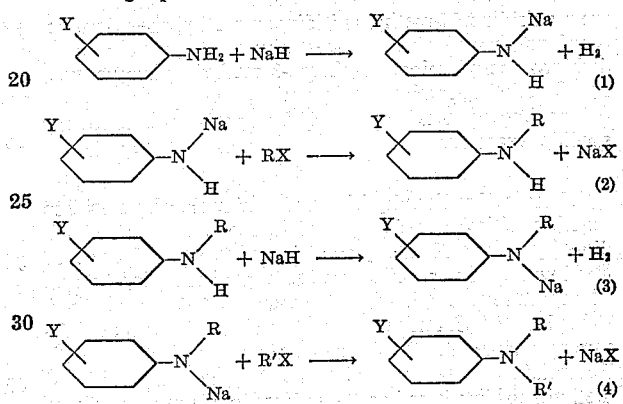

where Y is an organic radical or hydrogen or other atom which is inert toward sodium hydride, X is a halogen selected from the group consisting of chlorine, iodine and bromine, R and R' are the same or different organic radicals and RX and R'X are organic halides which are inert toward sodium hydride and in which the halogen is linked directly to an aliphatic carbon atom.

It has been discovered that the reaction is substantially unaffected by the character of the group represented by Y or Z in Formula a above if the group is inert toward sodium hydride. However, the group represented by Y, preferably, should not increase the basicity of the amine.

In the practice of the invention any organic chloride, bromide, or iodide may be used which is soluble in the polar solvent used and which is inert toward sodium hydride and in which the halogen is linked directly to an aliphatic carbon atom. However, the invention contemplates particularly alkylated products obtained by reaction with an organic halide selected from the group consisting of chlorides, bromides and iodides which is inert toward sodium hydride and in which the halogen is linked directly to an aliphatic carbon atom and wherein the organic radical is selected from the group consisting of an alkyl radical, an unsaturated aliphatic hydrocarbon radical, an aralkyl radical, a hydrocarbon radical which includes a nitrogen atom linked with three carbon atoms and epichlorohydrin. Illustrative examples of such halides are n-butyl bromide, ethyl iodide, methyl bromide, isopropyl chloride, allyl chloride, 1-chloro-2-butene, 1-chloro-2-hexene, benzyl chloride, p-methoxybenzyl chloride, 1-chloro-2-phenyl ethane, 2-chloro-2-dimethylamino propane, 1-chloro-2-dimethylamino propane, 1-bromo-3-N-methyl-N-ethylamino propane, and epichlorohydrin.

The polar solvents which may be used are those selected from the group consisting of straight chain aliphatic and cyclic ethers in which the ratio of the number of carbon atoms to the number of oxygen atoms is not greater than 4 to 1. Particularly suitable solvents are tetrahydrofuran, 1-4-dioxane and the dimethyl and diethyl ethers of the ethylene glycols, such as dimethyl ether of ethylene glycol, dimethyl ether of diethylene glycol, dimethyl ether of triethylene glycol and diethyl ether of ethylene glycol.

In accordance with the preferred practice of the invention a slurry of sodium hydride and the halide in the polar solvent is heated to about 100° C. and the aromatic amine dissolved in the polar solvent is added slowly to the slurry with agitation until evolution of hydrogen is substantially complete. The total time for the reaction usually is about one hour. The reaction mixture then is treated to isolate and recover the alkylated product. Although not essential, it is advantageous to employ sodium hydride in the form of a finely divided dispersion in an inert liquid, such as a mineral oil. Such a dispersion can be prepared by agitating sodium metal in the inert liquid in the presence of hydrogen while heating at a suitable hydriding temperature.

Illustrative examples of the class of aromatic amines which may be alkylated in accordance with the invention are p-anisidine, N-methyl anisidine, p-methyl phenylamine, p-chloro-phenylamine, 1,3-dimethyl phenylamine, 1,3-dichloro-phenylamine, 1-chloro-3-methyl phenylamine, 1,3-dimethyl-N-methyl phenylamine, etc.

The invention is illustrated further by the following specific examples.

*Example 1*

0.5 mole of sodium hydride and 0.25 mole of p-anisidine together with 0.5 mole of ethyl iodide were diluted with dimethyl ether of diethylene glycol in a two liter flask fitted with a stirrer, reflux condenser and dropping funnel. The mixture was agitated and heated gently. Metallation started at 40° C. and was complete in 2 hours. The mixture was heated at 80° C for one hour, cooled and filtered. The solid recovered was dried and analyzed. The yield of diethyl anisidine based on the sodium iodide recovered was 80%. The filtrate was distilled and a 80% yield of diethyl anisidine was recovered having a boiling point of 110° C. at 2 mm. of mercury.

*Example 2*

Using the same equipment as in Example 1, 0.5 mole of p-anisidine and 0.5 mole of ethyl bromide were diluted with dimethyl ether of diethylene glycol in the flask and heated to 110° C. with agitation. 1.0 mole of sodium hydride was added. Metallation started immediately and was complete in 1 hour. Then 0.5 mole of methyl iodide was added and the reaction mixture was agitated for an additional hour. The mixture was filtered and the product distilled. A yield of 83.5% of N-methyl-N-ethyl anisidine. The product had a boiling point of 77–79° C. at 3 mm. of mercury and analyzed 8.53% nitrogen, the theoretical being 8.47%.

*Example 3*

Using the same equipment as in Example 1, 0.5 mole of sodium hydride was added to a mixture of 0.5 mole of p-anisidine and 0.5 mole of benzyl chloride in dimethyl ether of diethylene glycol in the flask with agitation. The temperature was raised slowly. Metallation proceeded rapidly at 110° C. and was complete in 2 hours. The mixture was hydrolyzed and the layers separated. The organic phase was distilled and a product boiling at 155° C. at 3 mm. of mercury was collected. The material was extracted with hexane and recrystallized. The product had a melting point of 48–49° C. and the yield was 65.5%.

I claim:
1. In a method for alkylating a primary aromatic amine wherein a sodium salt of the amine is formed and is converted to a secondary amine by reaction with an organic halide, the improvement which comprises associating the halide and sodium hydride simultaneously with the amine in a polar solvent for the primary amine and the halide in the proportion of about one mole each of the halide and hydride for each mole of amine, and heating the mixture at a temperature between about 40° C. and 150° C. until substantially all the primary amine has been converted to a secondary amine.

2. The method as claimed by claim 1 wherein the heating is continued in the presence of additional amounts of hydride and halide in the proportion of about one mole of each for each mole of amine until substantially all the amine has been converted to a tertiary amine.

3. The method as claimed by claim 1 wherein the polar solvent is selected from the group consisting of tetrahydrofuran, 1-4-dioxane and the dimethyl and diethyl ethers of the ethylene glycols.

4. The method as claimed by claim 2 wherein the polar solvent is selected from the group consisting of tetrahydrofuran, 1-4-dioxane and the dimethyl and diethyl ethers of the ethylene glycols.

5. The method for alkylating an aromatic amine which comprises associating an organic halide and sodium hydride simultaneously with a primary aromatic amine in a polar solvent for the amine and the halide in the proportion of about one mole each of the halide and hydride for each mole of amine, and heating the mixture at a temperature between about 40° C. and 150° C. until substantially all the primary amine has been converted to a secondary amine, the primary amine being selected from the group consisting of p-anisidine, p-methyl phenylamine, p-chlorophenylamine, 1,3-dimethyl phenylamine, 1,3-dichlorophenylamine and 1-chloro-3-methyl phenylamine, the organic halide being selected from the group consisting of n-butyl bromide, ethyl iodide, methyl bromide, isopropyl chloride, allyl chloride, 1-chloro-2-butene, 1-chloro-2-hexene, benzyl chloride, p-methoxybenzyl chloride, 1-chloro-2-phenyl ethane, 2-chloro-2-dimethylamino propane, 1-chloro-2-dimethylamino propane, 1-bromo-3-N-methyl-N-ethylamino propane and epichlorohydrin.

6. The method as claimed by claim 5 wherein the heating is continued in the presence of additional amounts of hydride and halide in the proportion of about one mole of each for each mole of primary amine until substantially all the amine has been converted to a tertiary amine.

7. The method as claimed by claim 5 wherein the polar solvent is selected from the group consisting of tetrahydrofuran, 1-4-dioxane and the dimethyl and diethyl ethers of the ethylene glycols.

8. The method as claimed by claim 6 wherein the polar solvent is selected from the group consisting of tetrahydrofuran, 1-4-dioxane and the dimethyl and diethyl ethers of the ethylene glycols.

References Cited in the file of this patent

UNITED STATES PATENTS

| | | |
|---|---|---|
| 1,887,228 | Britton et al. | Nov. 8, 1932 |
| 2,501,556 | Whitman | Mar. 21, 1950 |